No. 803,090. PATENTED OCT. 31, 1905.
C. G. BRADFORD.
WEED DESTROYING MEANS.
APPLICATION FILED DEC. 12, 1904
2 SHEETS—SHEET 2.
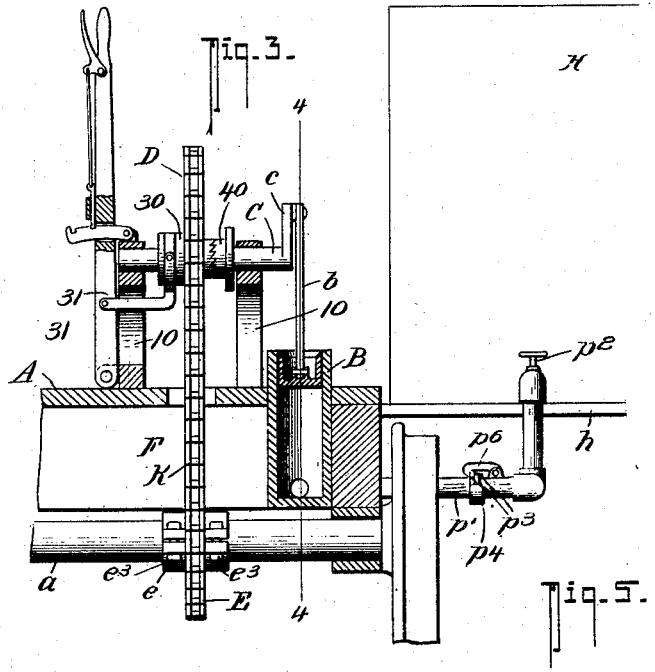
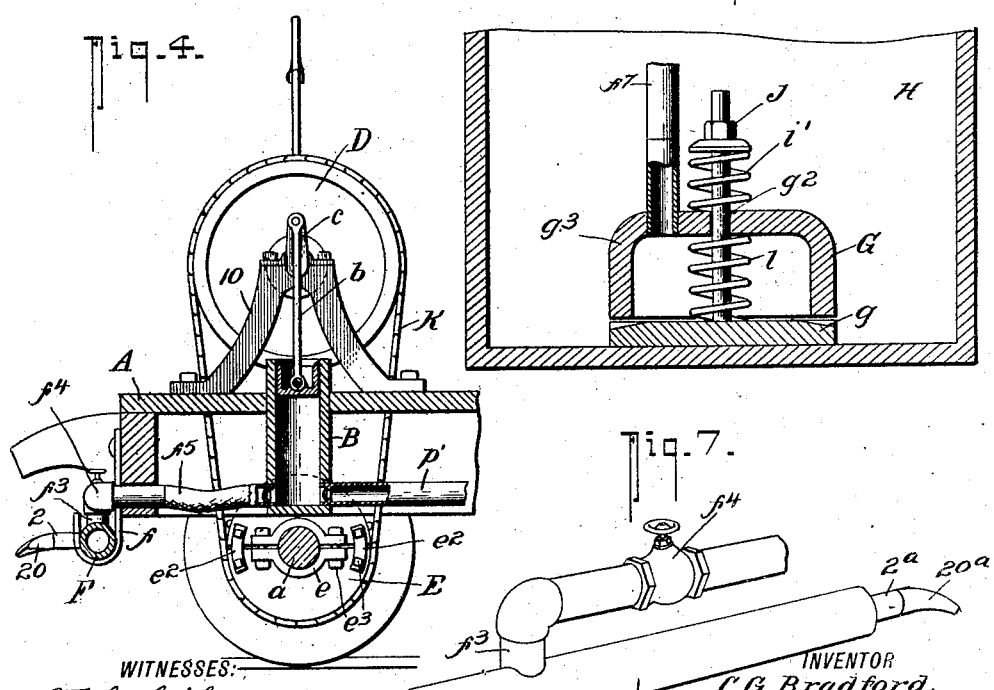
WITNESSES:
F. C. Gibson.
John T. Schrott.
INVENTOR
C. G. Bradford.
BY
Fred G. Dieterich
ATTORNEYS

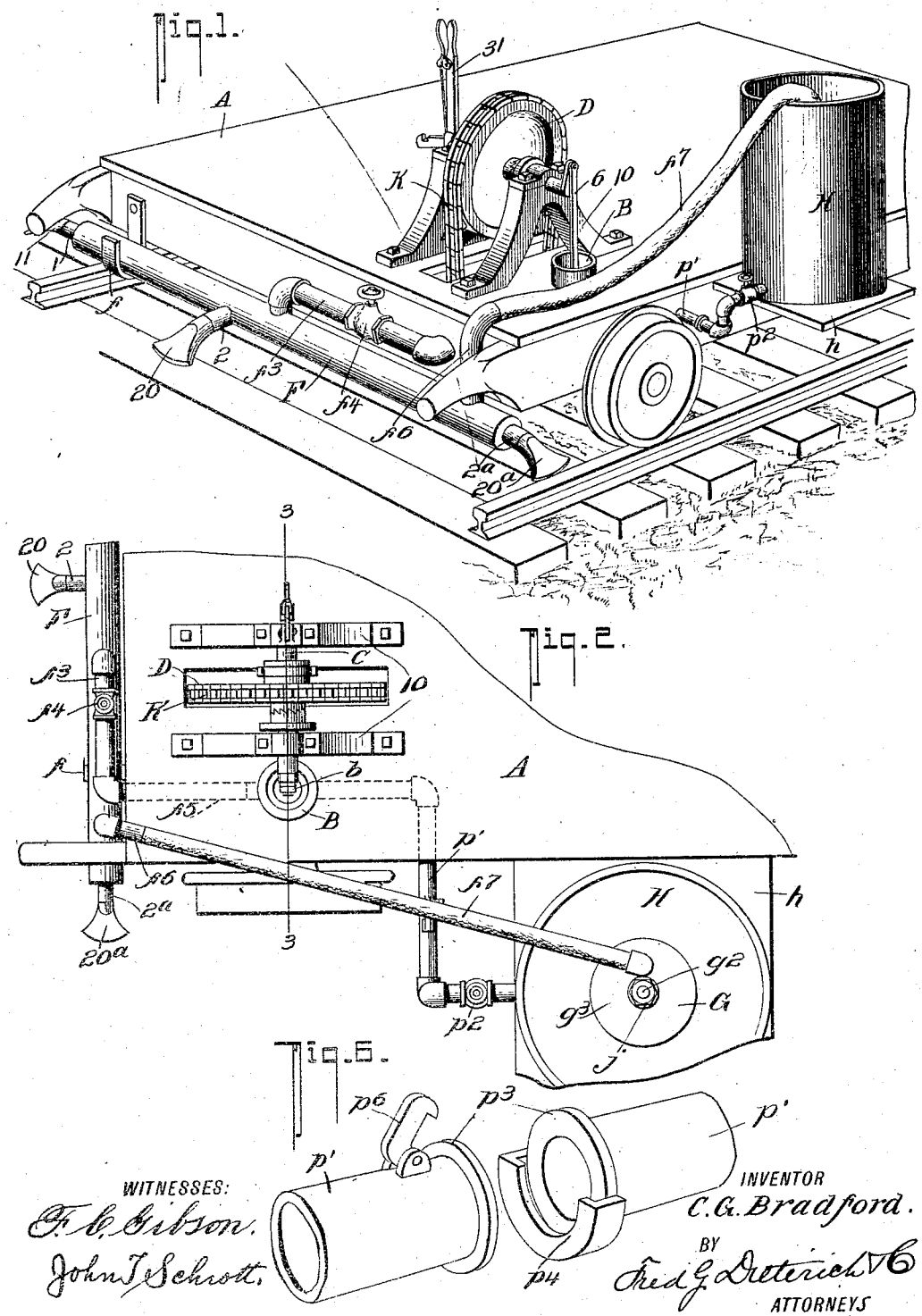

UNITED STATES PATENT OFFICE.

CASPER G. BRADFORD, OF TIPTONFORD, MISSOURI.

WEED-DESTROYING MEANS.

No. 803,090.  Specification of Letters Patent.  Patented Oct. 31, 1905.

Application filed December 12, 1904. Serial No. 236,526.

*To all whom it may concern:*

Be it known that I, CASPER G. BRADFORD, residing at Tiptonford, in the county of Newton and State of Missouri, have invented a new and Improved Weed-Destroying Means, of which the following is a specification.

My invention relates to that type of weed-destroying means used on railways and mounted upon hand or platform cars; and it primarily seeks to provide a means for the purpose stated of a simple and economical construction which can be easily manipulated and which will effectively serve its intended purpose.

In its generic nature my invention comprehends a spray-distributing member adapted to be supported transversely upon a hand or platform car, having a plurality of spraying-nozzles, a reservoir or supply-tank that contains the spraying liquid, a pump that connects with the spray-distributing pipe and the tank, and a pump-actuating mechanism coupled with the axle of one of the drive-wheels, and an automatically-operated means that relieves the distributing-pipe of excessive pressure by reason of a rapid speed of the car and the consequent pump action.

In its more complete form my invention includes, in combination with a spray-distributing means adapted to be connected to a car-body, including a pump actuated by the movement of the car, a reservoir for holding the spraying liquid, removably supported on the car-platform, a connection that joins the tank and the pump, having a special form of coupling whereby the reservoir may be readily removed from the car-platform without disarranging the spraying devices and the actuating-pump therefor, and a means for automatically relieving the spraying-pipe from excessive fluid-pressure and for utilizing the said excessive fluid-pressure by returning it to the tank-reservoir for agitating the contents of the holder or tank to constantly create a thorough intermixing of the spraying substance within the reservoir.

In its more specific nature my invention consists in certain details of construction and peculiar combination of parts, all of which will be hereinafter fully described, pointed out in the appended claims, and illustrated in the accompanying drawings, in which—

Figure 1 is a perspective view illustrating my invention as applied to a hand-car. Fig. 2 is a plan view thereof. Fig. 3 is a cross-section taken on the line 3 3 of Fig. 2. Fig. 4 is a detail longitudinal section taken on the line 4 4 of Fig. 3 and illustrating the sectional gear-wheel connections mounted on the pump drive-axle. Fig. 5 is a vertical section, on an enlarged scale, of the reservoir or tank with the combined pressure-equalizing and agitating device therein. Fig. 6 is a detail view of the coupling means in the lead pipe from the tank to the pump; and Fig. 7 is a detail view of a portion of the pipe that leads from the main or spray-distributing pipe to the pump, showing the check-valve therein.

In the practical application of my invention the same may be readily applied for use on the platform of an ordinary car or upon a hand-car platform; but when used on the latter type of car-platform the tank is removably mounted on the said car and connected with the pump devices by a coupling means capable of being quickly manipulated to allow for the rapid removal of the tank in cases of emergency, as will hereinafter be more fully explained.

In the drawings I have shown my invention as applied to the ordinary type of hand-car, with the propelling power omitted.

A designates the platform, and $a$ one of the wheeled axles, which, as shown, is the driving power for actuating the pump B, which is pendently secured on the platform A adjacent the axle $a$ and has the upper end of its piston-rod $b$, arranged to connect with the crank member $c$ of the shaft C, journaled in the bearing-brackets 10 10, that project up from the platform A. Upon the crank-shaft C is mounted a chain-wheel D, around which and a chain-wheel E, fixedly mounted on the drive-axle $a$, takes the endless drive-chain K, as clearly shown in Fig. 4, by reference to which it will be also noticed the said wheel E is composed of two half-sections, each of which has a semicircular hub-section $e$ $e$ to receive the clamp-bands $e'$, and said sections are further joined by the clamp members $e^2$ $e^2$ at each face of the wheel, that are joined by the bolts $e^3$ $e^3$, as shown. By making the wheel E in the manner stated it can be easily fitted upon the drive-axle $a$ without removing the track-wheels and without trouble.

F designates the main spraying-pipe pendently mounted in bearings $f$ $f$ on the end of the car-platform, and the said pipe has a plurality of spraying members joined therewith, three being shown in the drawings designated 1, 2, and 2ª, arranged one at each end and one at the center, and to facilitate the discharge of the liquid at such points on the track-bed desired the sprayers 1, 2, and 2ⁿ are in the nature of flexible tubes, whose outer ends have spray-nozzles 11, 20, and 20ⁿ, as shown. The pipe F at or near the center thereof has an intake $f^3$, provided with a regulating-valve $f^4$ and which connects, through the flexible tube $f^5$, with the discharge of the pump P, as shown. The distributing-pipe F is also provided with an outlet $f^6$, to which is connected one end of a flexible pipe $f^7$ that joins with an automatically-actuated pressure-relief valve G, mounted within the tank or reservoir H, that contains the spraying liquid and which when used on a hand-car, as shown, is preferably mounted upon a bracket $h$, that projects from the side of the car, as clearly illustrated in Fig. 1, to facilitate its ready removal in cases of emergency.

The relief-valve G consists of a metal base $g$, having a series of radial grooves in its upper face and a central vertical stem $g^2$, upon which is mounted a hollow inverted cup or dome member $g^3$, yieldingly mounted upon the stem $g^2$ and held balanced under ordinary conditions by a cushion-spring $i$ on the stem $g^2$ beneath it and a similar spring $i'$ above it, the tension of the latter being regulated by a set-nut $j$, the tightening of which serves to hold the hollow cup $g^3$ down the more tightly against the base, and consequently requires a greater fluid-pressure to lift the cap, the reason for which will be presently explained.

The pipe $p'$, that connects the pump with the tank, is of metal and is provided with a valve $p^2$ near the tank to cut off the spraying fluid from the tank, and when my invention is used on a hand-car, as shown, the said pipe $p'$ is composed of two sections joined by a coupling, which includes two disks $p^3 p^3$, one of which has a segmental flange $p^4$ to fit over the rim of the other disk and the other has a clamping-lever $p^6$, connected thereto, having a clamping-jaw for engaging the disk-rims and adapted to be held locked to the opposing pipe-section in the manner clearly shown in Fig. 4. To make a fluid-tight joint, the faces of the disks $p^3 p^3$ may have rubber jackets or washers, as shown.

By reason of connecting the two sections of pipe $p'$ in the manner stated it is manifest that in case of emergency when the car must be quickly lifted off the track one of the car crew quickly detaches the tank connection to the pump and lifts off the tank, while the other crewmen lift the car off the track.

When my improvements are used on an ordinary platform-car, the pipe $p'$ can be a continuous one and not require the coupling means specified.

To throw the pump out of action, the chain-wheel on the crank-shaft is slidably mounted upon the said shaft and has a flanged hub 30, with which engages the forked end of a shifting-lever 31, suitably mounted on the framing, the movement of which in the proper direction will throw the chain-wheel out of engagement with a clutch-collar 40, fixedly mounted on the crank-shaft.

From the foregoing description, taken in connection with the accompanying drawings, it is believed the complete construction of my invention will be readily understood. To bring the same into operation, it is only necessary to open the valve in the pipe $p'$ from the tank to the pump and start the pump by throwing the drive-wheel on the crank-axle into mesh with the clutch-collar on the said shaft, and assuming the car to be in motion the pump will take the spraying fluid from the tank and eject it under pressure through the spraying-tube. Should the speed of the car become excessive and the pump action be such as to exert a pressure on the liquid in the distributing-pipe in excess of what the relief-valve in the tank is adjusted for, the fluid that passes from the distributing-pipe into the dome of the relief-valve by reason of increased pressure would lift the said dome, and in consequence provide for a free escape of the fluid back into the tank, thus relieving the distributing-pipe of undue pressure and at the same time by reason of the return flow to the tank provide for a thorough agitation of the spraying mixture within the tank.

Having thus described my invention, I claim and desire to secure by Letters Patent—

1. In a weed-destroying means of the character described, the combination with the car-platform, the tank removably mounted thereon, a pump on the car, a pipe connection that joins the pump and the tank, said connection being of two sections, an adjustable coupling for joining said sections, and pump-actuating mechanism geared with and operated from one of the car-axles; of a distributing-pipe having one or more flexible discharge-nozzles, a valved intake-pipe therefor that connects with the pump, and an outflow-pipe connected at one end to the distributing-pipe and having its other end held within the tank and a valve at said other end of said outflow-pipe and within the tank, to open up under excess pressure from the distributing-pipe substantially as shown and described.

2. In combination with a tank, the pump in connection therewith, and the distributing-pipe supplied from the pump, said pipe having a supplemental discharge; of a relief-valve mounted in the tank, said valve comprising a base, having a central stem, an inverted cap or dome held against said base and apertured to permit passage of said stem, a coil-spring on said stem between the dome and the base, a second coil-spring on said stem outside of said dome and a check-nut on said stem against which the second spring abuts, a pipe connection joining the supplemental discharge of the distributing-pipe with the hollow dome of the relief-valve in the tank substantially as shown and described.

3. A weed-destroying device comprising the combination with a hand-car, of a tank detachably mounted at one side of said hand-car to the platform thereof, a pump mounted on said hand-car, drive mechanism connecting the pump with the car-axle, means for shifting the said drive mechanism from operative connection with the pump, a valved pipe connection joining the tank to the pump, a distribution-pipe arranged transversely across the end of the car-platform, hangers connected to the car-platform to receive said distribution-pipe, a valved pipe connection between said distribution-pipe and said pump, a plurality of nozzles connected with said distribution-pipe, a supplemental discharge for said distribution-pipe, a flexible connection connected at one end to said supplemental discharge, and having its other end passing down into the tank, a relief-valve connected to the free end of said last-named flexible pipe connection and held loosely within the tank, all being arranged substantially as shown and described.

4. An apparatus of the character stated comprising the combination with a hand-car, a pump mounted thereon, drive mechanism for said pump, said pump-drive mechanism being connected with the drive-axle of the car, lever-operated clutch devices for connecting and disconnecting said pump-drive mechanism from operative connection with the car-axle, a supplemental platform connected to the car-platform at one side thereof, a tank held on said supplemental platform, a valved pipe connecting the pump with said tank, said valved pipe connection consisting of two parts detachably connected to one another to permit the removal of the tank at times, a distribution-pipe transversely held across the end of the car, distribution-nozzles at each end of the distribution-pipe, a supplemental distribution-nozzle intermediate of the ends of the said distribution-pipe and arranged to discharge at right angles to the first-mentioned nozzles, a valved pipe connection between said distribution-pipe and said pump, a flexible pipe connected at one end to said distribution-pipe and arranged with its free end loosely held in the tank, a valve connected to said free end of the flexible pipe and arranged to open under excess pressure within the distributing-pipe, all being arranged substantially as shown and described.

C. G. BRADFORD.

Witnesses:
LEE DAVIS,
J. F. OSBORNE.